US012370117B2

(12) United States Patent
Hsu et al.

(10) Patent No.: US 12,370,117 B2
(45) Date of Patent: Jul. 29, 2025

(54) EXOSKELETON ROBOTIC EQUIPMENT FOR TENODESIS GRASP AND RELEASE TRAINING

(71) Applicant: NATIONAL CHENG KUNG UNIVERSITY, Tainan (TW)

(72) Inventors: Hsiu-Yun Hsu, Tainan (TW); Chien-Hsien Yeh, Tainan (TW); Kang-Chin Yang, Taipei (TW); Ping-Han Chuang, Tainan (TW); Fong-Chin Su, Tainan (TW); Li-Chieh Kuo, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 1033 days.

(21) Appl. No.: 17/339,534

(22) Filed: Jun. 4, 2021

(65) Prior Publication Data

US 2022/0054344 A1 Feb. 24, 2022

(30) Foreign Application Priority Data

Aug. 19, 2020 (TW) ................................ 109128188

(51) Int. Cl.
*A61H 1/02* (2006.01)

(52) U.S. Cl.
CPC ..... *A61H 1/0288* (2013.01); *A61H 2201/149* (2013.01); *A61H 2201/1638* (2013.01); *A61H 2201/165* (2013.01); *A61H 2201/1659* (2013.01); *A61H 2201/1664* (2013.01); *A61H 2201/5069* (2013.01)

(58) Field of Classification Search
CPC .......... A61H 1/00; A61H 1/02; A61H 1/0285; A61H 1/0288; A61H 2201/149; A61H 2201/1638; A61H 2201/165; A63B 23/16; B25J 9/0006
USPC .............................................................. 601/5
See application file for complete search history.

(56) References Cited

U.S. PATENT DOCUMENTS

| | | | | |
|---|---|---|---|---|
| 8,585,620 | B2* | 11/2013 | McBean | A61H 1/008 601/24 |
| 2019/0175376 | A1* | 6/2019 | Peisner | A61F 5/013 |
| 2019/0274911 | A1* | 9/2019 | Kesner | A61F 2/68 |
| 2019/0332172 | A1* | 10/2019 | Bae | G06F 3/014 |
| 2020/0360169 | A1* | 11/2020 | Kelly | A61F 5/0127 |
| 2021/0401657 | A1* | 12/2021 | Song | A61H 1/0288 |

* cited by examiner

*Primary Examiner* — Rachel T Sippel
*Assistant Examiner* — Gwynneth L Howell
(74) *Attorney, Agent, or Firm* — Muncy, Geissler, Olds & Lowe, P.C.

(57) ABSTRACT

An exoskeleton robotic equipment for tenodesis grasp and release training includes an exoskeleton mechanism and a control device. The exoskeleton mechanism includes a fixing seat worn on a forearm, an actuator device mounted to the fixing seat, and a transmission module connected to the fixing seat and pivotally connected to the actuator device and cooperating with the fixing seat and the actuator device to form a four-bar linkage mechanism. The actuator device is controlled by the control device to drive the transmission module to move relative to the fixing seat to change the transmission module into a release state and into a grasp state so as to move the index finger and the middle finger away from and toward the thumb.

2 Claims, 8 Drawing Sheets

EXOSKELETON ROBOTIC EQUIPMENT FOR TENODESIS GRASP AND RELEASE TRAINING

CROSS-REFERENCE TO RELATED APPLICATION

This application claims priority to Taiwanese Patent Application No. 109128188, filed on Aug. 19, 2020.

FIELD

The disclosure relates to an assistive device, more particularly to an exoskeleton robotic equipment for tenodesis grasp and release training.

BACKGROUND

For stroke patient who suffers from moderate and severe paralysis in upper limbs, high intensity and repetitive physical rehabilitation training is required to activate cerebral cortex plasticity so as to facilitate recovery and improvement in functions of the upper limbs, e.g., arm movement and hand gripping functions. Currently, rehabilitation training for such stroke patient relies on professional clinical therapist to provide physical assistance aside. Thus, the stroke patient needs to go to hospital or clinical institutes in person, which is quite inconvenient. Additionally, the rehabilitation training for each patient usually spends a lot of time. Since the shortage of human resource in clinical institutes, some rehabilitation training movements are omitted or the training time period is reduced, which reduces the effectiveness of rehabilitation.

Taking hand grasping training as an example, lots of conventional training devices are developed and can be classified into two categories of hand movement and wrist movement based on training mechanism. Hand movement training equipment is usually designed to independently activate five fingers, thus occupies a relatively large dimension and is inconvenient to carry and set up. Since 80% of the hand movements are completed by cooperation of the thumb with the index finger and the middle finger, it is beneficial to increase training intensity to thumb and two radial fingers.

SUMMARY

Therefore, an object of the disclosure is to provide an exoskeleton robotic equipment for tenodesis grasp and release training capable of utilizing tenodesis effect to increase efficiency of rehabilitation training.

According to an aspect of the disclosure, an exoskeleton robotic equipment for tenodesis grasp and release training is provided. The exoskeleton robotic equipment includes an exoskeleton mechanism and a control device. The exoskeleton mechanism is adapted to be worn on a forearm and a hand extending from the forearm of a stroke patient and includes a fixing seat, an actuator device, and a transmission module. The fixing seat is adapted to be worn on the forearm. The actuator device is mounted to the fixing seat. The transmission module is connected to the fixing seat and is pivotally connected to the actuator device. The transmission module includes a first grasp rod and a second grasp rod. The first grasp rod is adapted to be mounted fixedly to an index finger and a middle finger of the hand. The second grasp rod is pivotally connected to the first grasp rod, and is adapted to be mounted fixedly to a thumb of the hand. The transmission module cooperates with the fixing seat and the actuator device to form a four-bar linkage mechanism. The actuator device is controlled by the control device to drive the transmission module to move relative to the fixing seat to change the transmission module into a release state such that the first grasp rod and the second grasp rod pivot away from each other so as to move the index finger and the middle finger away from the thumb, and into a grasp state such that the first grasp rod and the second grasp rod pivot toward each other so as to move the index finger and the middle finger toward the thumb.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
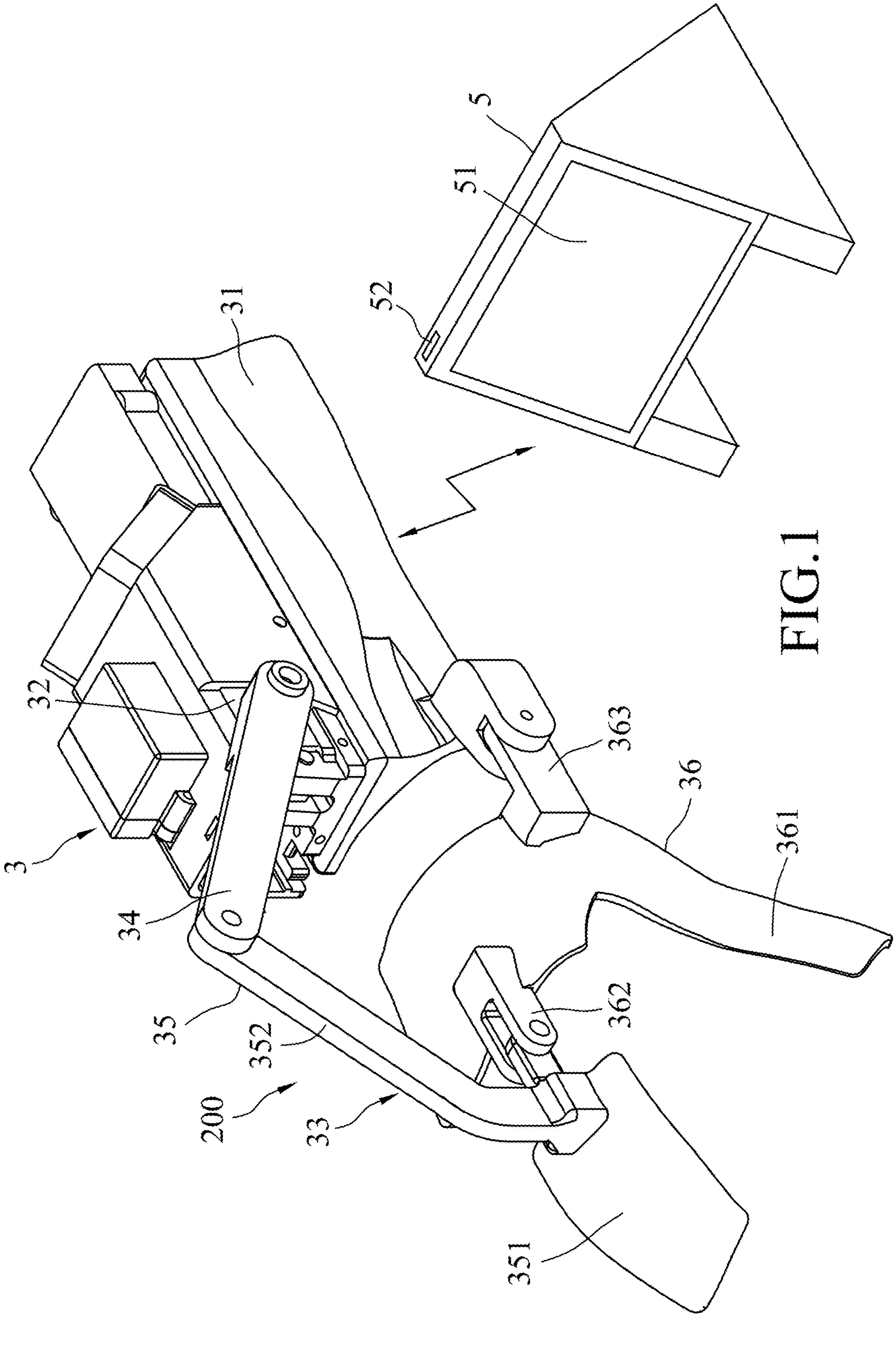
FIG. 1 is a perspective view of a first embodiment of an exoskeleton robotic equipment for tenodesis grasp and release training of the present disclosure.

Before the present disclosure is described in greater detail, it should be noted herein that like elements are denoted by the same reference numerals throughout the disclosure.

Figure 2:
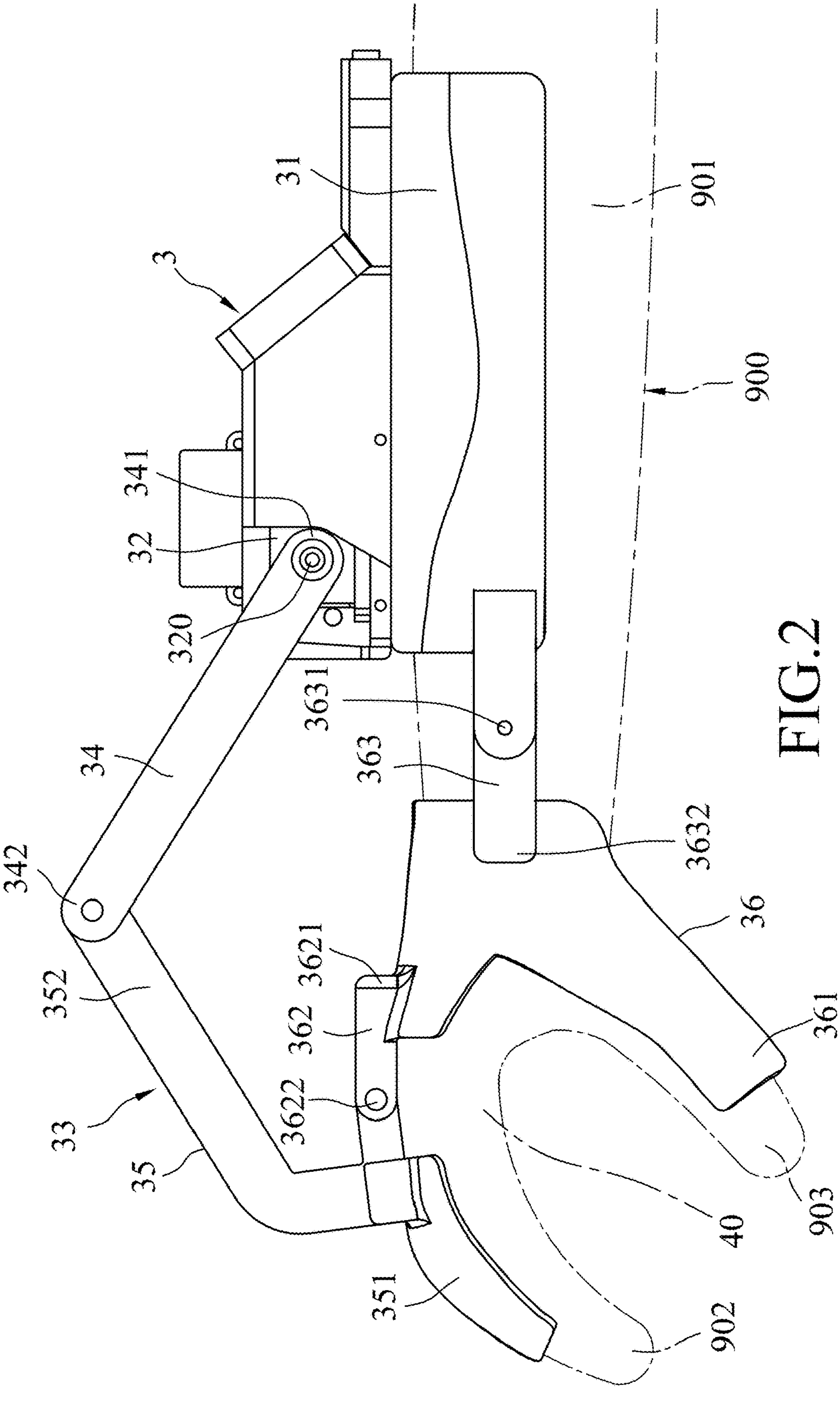
FIG. 2 is a schematic side view of an exoskeleton robotic mechanism of the first embodiment worn on a forearm and a hand extending from the forearm, illustrating a transmission module being in a general state.

Referring to FIGS. 1 and 2, a first embodiment of an exoskeleton robotic equipment 200 for tenodesis grasp and release training of the present disclosure is for rehabilitation training to a wrist and fingers of a stroke patient at the same time. When the wrist is extended and flexed, grasp and release of the fingers are caused due to the tenodesis effect.

The exoskeleton robotic equipment 200 includes an exoskeleton mechanism 3 adapted to be worn on a forearm 901 and a hand extending from the forearm 901 of a stroke patient, an angle detecting device 4 mounted to the exoskeleton mechanism 3, and a control device 5 communicatively connected to the exoskeleton mechanism 3 and the angle detecting device 4. Note that an assembly of the forearm 901 and the hand is referred to as a hand portion 900 hereinafter.

Figure 3:
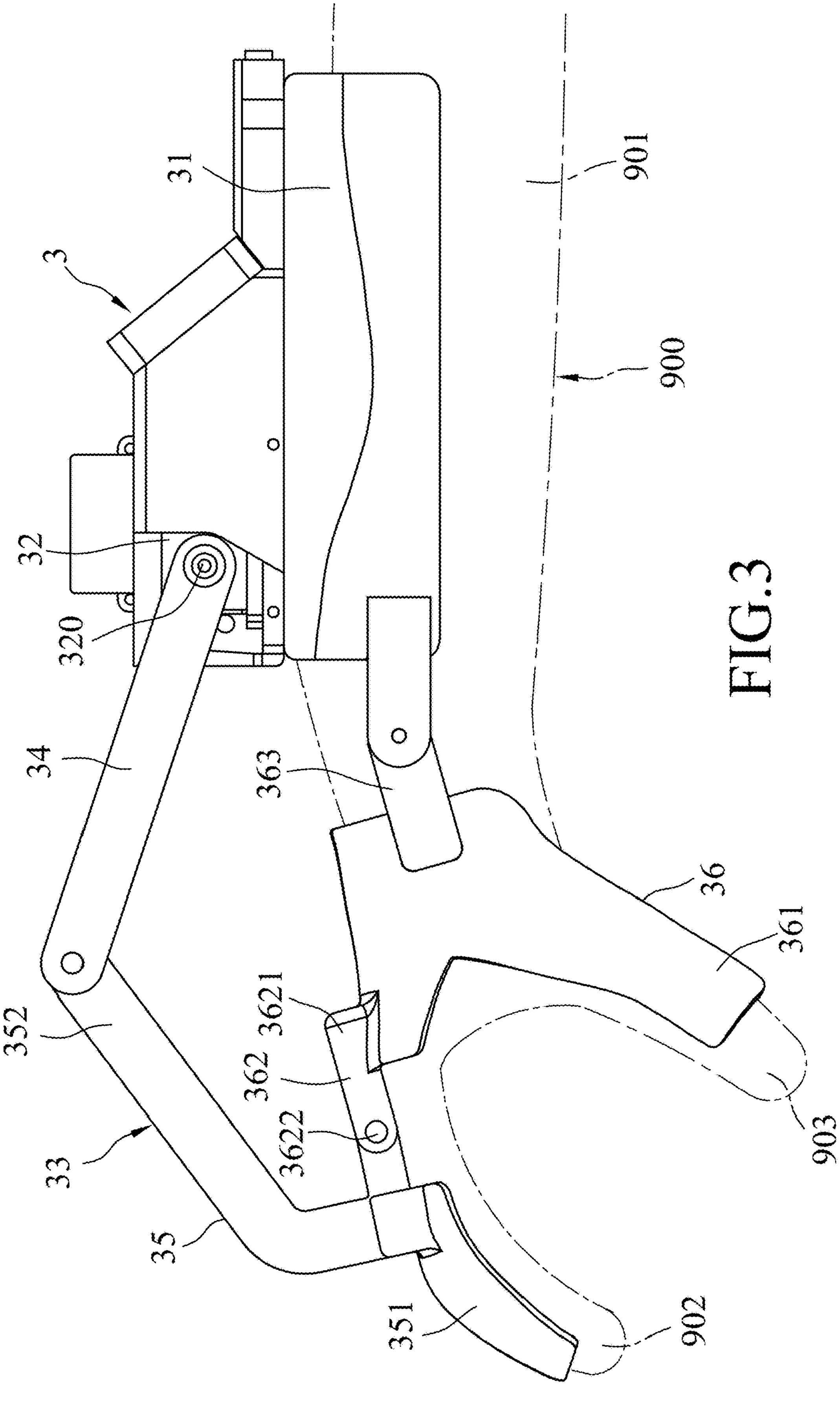
FIG. 3 is similar to FIG. 2, but illustrating the transmission module being in a release state.

Referring to FIG. 3, the exoskeleton mechanism 3 includes a fixing seat 31 mounted to the forearm 901, an actuator device 32 mounted to the fixing seat 31, and a transmission module 33 connected to the fixing seat 31, pivotally connected to the actuator device 32, and adapted to be mounted fixedly to the fingers. In one embodiment, the fixing seat 31 may be mounted to the forearm 901 by a plurality of straps (not shown), but the manner in which the fixing seat 31 is connected to the forearm 901 is not limited to the example described herein. In one embodiment, a three-dimensional image of hand portion 900 of the stroke patient is obtained from performing three-dimensional scan to the hand portion 900, and then the exoskeleton mechanism 3 is tailor-made according to the three-dimensional image of the stroke patient using three-dimensional printing techniques.

The transmission module 33 includes a transmission member 34, a first grasp rod 35 adapted to be mounted fixedly to an index finger and a middle finger of the hand, and a second grasp rod 36 pivotally connected to the first grasp rod 35, and adapted to be mounted fixedly to a thumb 903 of the hand. The transmission module 33 cooperates with the fixing seat 31 and the actuator device 32 to form a four-bar linkage mechanism. Since the index finger and the middle finger are simultaneously moved by the first grasp rod 35, in the following description, the index finger and the middle finger are referred to as an index-middle fingers 902 for convenience.

In this embodiment, the actuator device 32 includes a rotating shaft 320. The transmission member 34 has rear and front ends 341, 342 connected pivotally and respectively to the rotating shaft 320 of the actuator device 32 and the first grasp rod 35. The first grasp rod 35 includes a first mount segment 351 that is adapted to be mounted fixedly to an exterior of the index-middle fingers 902, and a first driven link 352 extends that upwardly and rearwardly from the first mount segment 351 and that is pivotally connected to the front end 342 of the transmission member 34. The second grasp rod 36 includes a second mount segment 361 adapted to be mounted fixedly to an exterior of the thumb 903, a second driven link 362 extending forwardly from a top end of the second mount segment 361 and having a first end 3621 that is connected fixedly to the top end of the second mount segment 361 and a second end 3622 that is pivotally connected to a lower end of the first driven segment 352, and a third driven link 363 extending from the second mount segment 361 toward the fixing seat 31 and having opposite ends 3631, 3632 pivotally and respectively mounted to the fixing seat 31 and the second mount segment 361.

In one embodiment, the first mount segment 351 and the second mount segment 361 can be respectively tied on the index-middle fingers 902 and the thumb finger 903 of the hand by a plurality of straps (not shown), but the manner for connection is not limited to the example described herein.

Figure 4:
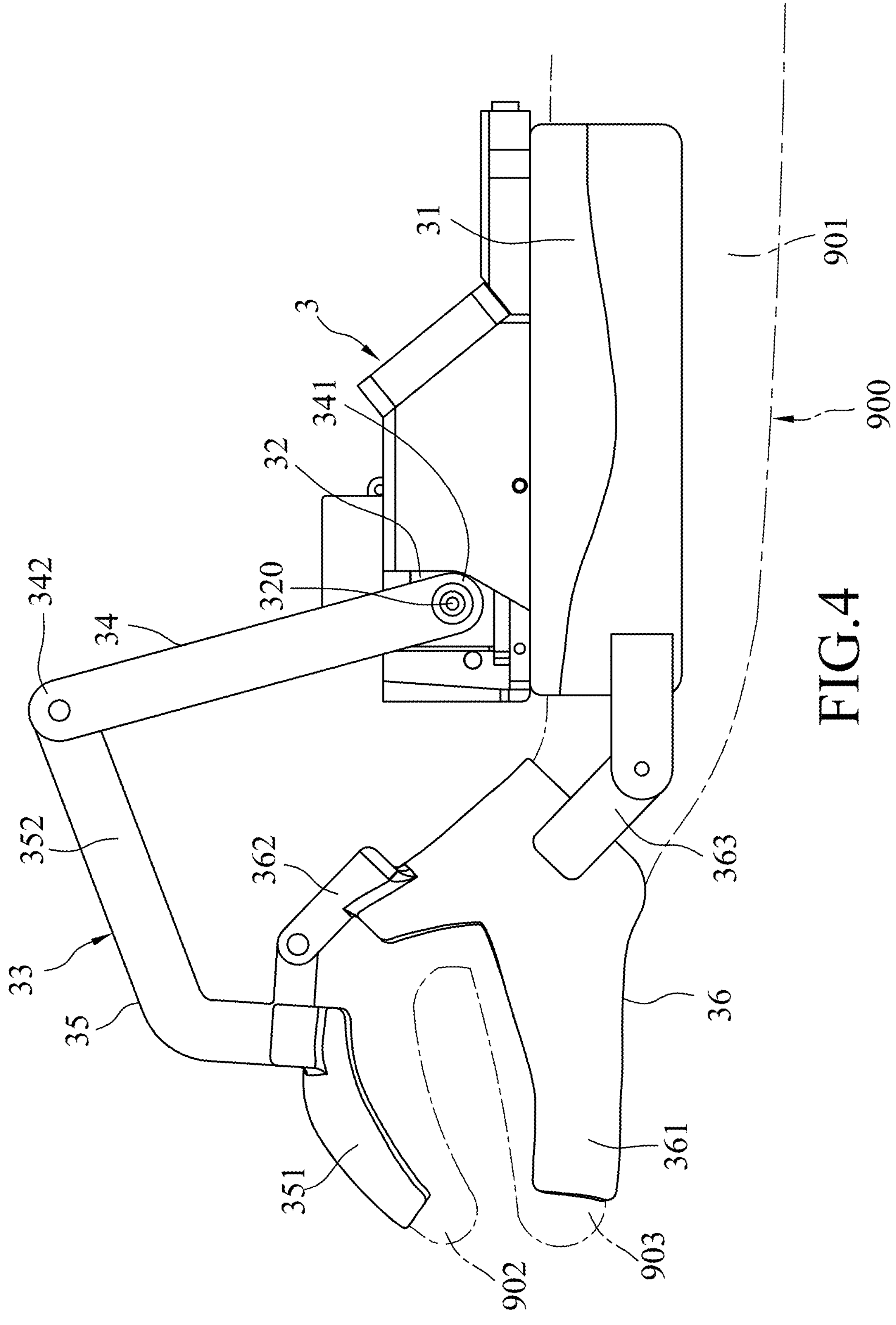
FIG. 4 is similar to FIG. 2, but illustrating the transmission module being in a grasp state.

Referring to FIGS. 2 to 4, in the first embodiment, the actuator device 32 is a servo motor including the rotating shaft 320 that is connected to the transmission member 34, and that is controlled by the control device 5 to rotate so as to drive the transmission member 34 to pivot. Then, the transmission member 34 drives the first grasp rod 35 and second grasp rod 36 to pivot relative to the fixing seat 31 so that the transmission module 3 is changed from a general state (see FIG. 2) to one of a release state (see FIG. 3) and a grasp state (see FIG. 4) such that the wrist is driven to bend downwardly or upwardly, and the index-middle fingers 902 move away from or toward the thumb 903.

Specifically, as the actuator device 32 drives the transmission module 33 to change from the general state to the grasp state, the transmission member 34 pivots relative to the fixing seat 31 such that the front end 342 moves upwardly to drive the first grasp rod 35 and the second grasp rod 36 to pivot upwardly relative to the fixing seat 31 through operation of the four-bar linkage mechanism so the wrist is driven to bend upwardly. Thus, the first grasp rod 35 and the second grasp rod 36 pivot toward each other to thereby move the index-middle fingers 902 toward the thumb 903 to perform a grasping movement.

On the other hand, as the actuator device 32 drives the transmission module 33 to change from the general state to the release state, the transmission member 34 pivots relative to the fixing seat 31 such that the front 342 moves downwardly to drive the first grasp rod 35 and the second grasp rod 36 to pivot downwardly relative to the fixing seat 31 through operation of the four-bar linkage mechanism so the wrist is driven to bend downwardly. Thus, the first grasp rod 35 and the second grasp rod 36 pivot away from each other to thereby move the index-middle fingers 902 away from the thumb 903 to perform a release movement.

When the actuator device 32 is not controlled to drive the transmission module 33, the rotating shaft 320 is free to rotate. At this time, the stroke patient may bend his/her wrist upwardly and downwardly or to move the index-middle fingers 902 and the thumb 903 to drive the transmission module 33 to change from the general state to one of the release and grasp states so that the stroke patient can perform self training.

Figure 5:
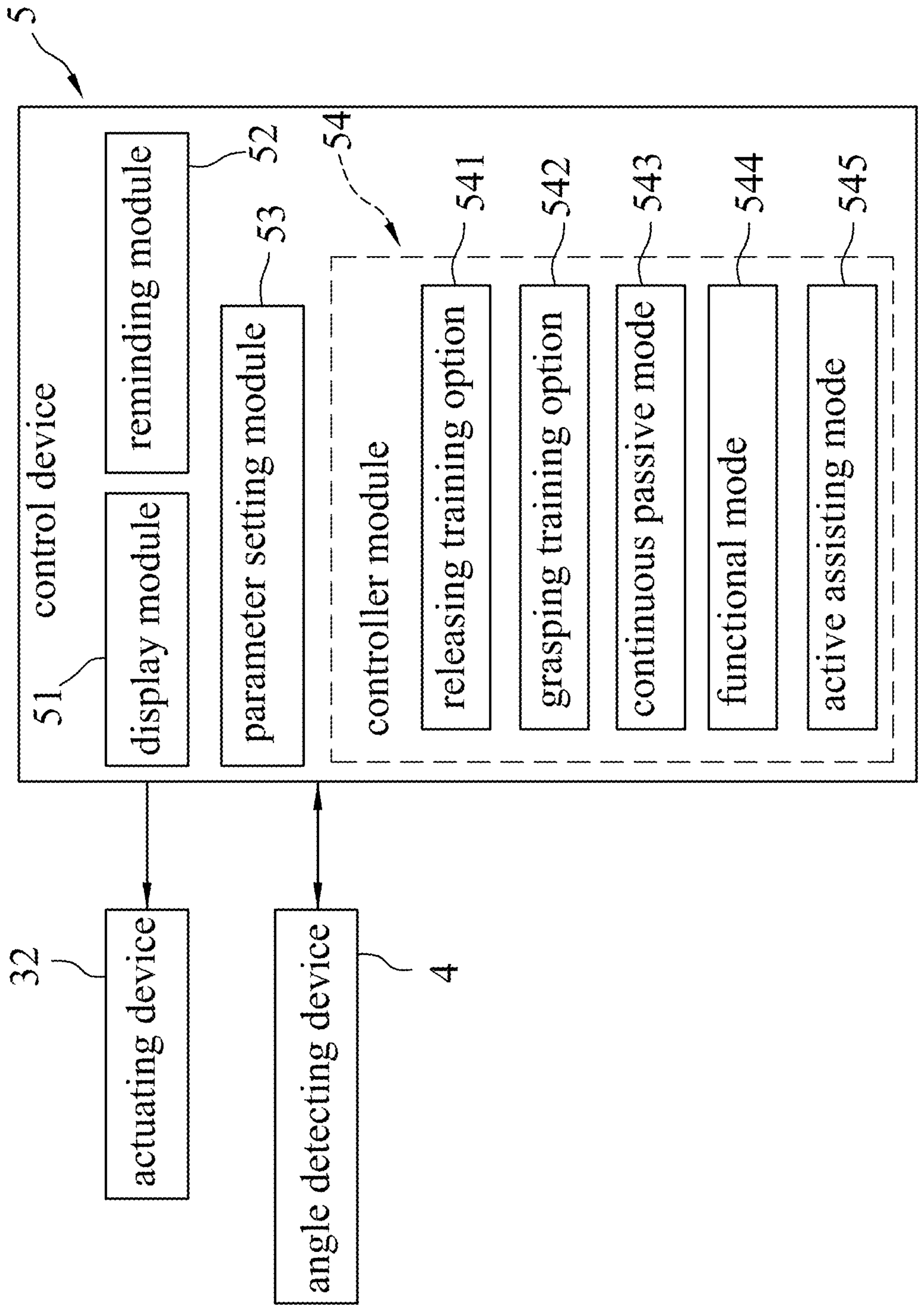
FIG. 5 is a block diagram of the first embodiment.

Referring to FIG. 5, the angle detecting device 4 is configured to detect a rotational angle of the rotating shaft 320 of the actuator device 32, and communicatively connected to the control device 5. In this embodiment, the angle detecting device 4 is implemented by hall sensors to detect the rotational angle of the rotating shaft 320, but the manners for detecting the rotational angle are numerous and the present disclosure is not limited to the example described herein. In other embodiments of the present disclosure, the angle detecting device 4 may directly detect a pivot angle of the transmission module 33 changed from a general state to one of the release state and the grasp state.

The control device 5 is communicatively connected to the actuator device 32 and the angle detecting device 4 and includes a display module 51, a reminding module 52, a parameter setting module 53, and a controller module 54 communicatively connected to the parameter setting module 53. The parameter setting module 53 is operable to set one of a rehabilitation angle, the number of times of rehabilitation, rehabilitation time period, a frequency of movement, a first time period, a second time period, a reaction time period, and combination thereof. The display module 51 is configured to display one of the rehabilitation angle, the number of times of rehabilitation, the rehabilitation time period, the frequency of movement, the first time period, the second time period, the reaction time period, and a combination thereof.

The control module 54 is configured to operate under one of a releasing training option 541 and a grasping training option 542, and to operate, when one of the releasing training option 541 and the grasping training option 542 is selected, under a continuous passive mode 543, a functional mode 544, or an active assisting mode 545. When the control module 54 operates under the continuous passive mode 543, the parameter setting module 53 can be operated to set the rehabilitation angle, the number of times of rehabilitation, the rehabilitation time period, and the frequency of movement. When the control module 54 operates under the functional mode 544, the parameter setting module 53 can be operated to set the rehabilitation angle, the number of times of rehabilitation, the rehabilitation time period, a first time period and a second time period. When the control module 54 operates under the active assisting mode 545, the parameter setting module 53 can be operated to set the rehabilitation angle, the number of times of rehabilitation, the rehabilitation time period, and a reaction time period.

The control module 54 is configured to, when operating under the continuous passive mode 543, control the actuator device 32 to control operation of the transmission module 33 based on the rehabilitation angle, the number of times of rehabilitation, the rehabilitation time period, and frequency of movement set by the parameter setting module 53. The control module 54 is configured to, when operating under the continuous passive mode 543, control the actuator device 32 to drive the transmission module 33 to reciprocally and continuously change between the general state and one of the release state and the grasp state based on the frequency of movement, e.g., but not limited to fifteen times per minute, calculate the rehabilitation time period when the transmission module 33 pivots from the general state to one of the release state and the grasp state by the pivot angle that is equal to the rehabilitation angle, and accumulate a number of rehabilitation movements each time the pivot angle is equal to the rehabilitation angle. The control module 54 is communicatively connected to the reminding module 52 and configured to drive the reminding module 52 to output a reminding signal to notify the stroke patient when the number of times of rehabilitation or the rehabilitation time period is reached.

The control module 54 is configured to, when operating under the functional mode 544, control the actuator device 32 to drive the transmission module 33 to move based on the rehabilitation angle, the number of times of rehabilitation, rehabilitation time period, the first time period and the second time period. Specifically, the control module 54 is configured to, when operating under the functional mode 544, control the actuator device 32 to drive the transmission module 33 to reciprocally and continuously change between the general state and one of the release state and the grasp state, calculate the rehabilitation time period when the transmission module 33 pivots from the general state to one of the release state and the grasp state, control the transmission module 33 to operate under the release state for the first time period when the transmission module 33 changes to the release state, control the transmission module 33 to operate under the grasp state for a second time period when the transmission module 33 changes to the grasp state, and accumulate the number of rehabilitation movements. The control module 54 drives the reminding module 52 to output the reminding signal to notify the stroke patient when the number of times of rehabilitation and/or the rehabilitation time period is reached.

The control module 54 is configured to, when operating under the active assisting mode 545, control the actuator device 32 to control operation of the transmission module 33 based on the rehabilitation angle, the number of times of rehabilitation, rehabilitation time period, and the reaction time. Specifically, the control module 54 is configured to, when operating under the active assisting mode 545, calculate the rehabilitation time period, control the actuator device 32 to deactivate the transmission module 33 so as to allow free rotation of the rotating shaft 320, detect the rotational angle of the rotating shaft 320 that is driven by the transmission module 33, and determine whether the rotational angle is smaller than the rehabilitation angle within a predetermined reaction time period. The control module 54 is configured to, when the determination is affirmative, control the actuator device 32 to drive the transmission module 33 to pivot relative to the fixing seat 31 until the rotational angle is equal to the rehabilitation angle and to accumulate the number of times of rehabilitation. At this time, the control module 54 controls the actuator device 32 to deactivate the transmission module 33 again to allow the stroke patient to perform training movement. The control module 54 is configured to drive the reminding module 52 to output a reminding signal to notify the stroke patient when the number of times of rehabilitation or the rehabilitation time period is reached.

When the exoskeleton robotic equipment 200 is in use, the exoskeleton mechanism 3 is worn on the hand portion 900 of the stroke patient. The control device 5 is communicatively connected to the exoskeleton mechanism 3 and the angle detecting device 4 such that the control device 5 is operated to select one of the releasing training option 541 and the grasping training option 542, and is further operated to select one of the continuous passive mode 543, the functional mode 544, and the active assisting mode 545 after one of the releasing training option 541 and the grasping training option 542 is selected. Then, the parameter setting module 53 is operated to set parameters based on the selected mode. Specifically, when the control module 54 operates under the releasing training option 541, the parameter setting module 53 sets the rehabilitation angle by which the transmission module 33 pivots relative to the fixing seat 31 as the transmission module 33 is controlled to change from the general state to the release state. On the other hand, when the control module 54 operates under the grasping training option 542, the parameter setting module 53 sets the rehabilitation angle by which the transmission module 33 pivots relative to the fixing seat 31 as the transmission module 33 is controlled to change from the general state to the grasp state. Additionally, when the stroke patient is unable to autonomously move his/her fingers, the control module 54 can be selected to operate under the continuous passive mode 543 or the functional mode 544, whereas when the stroke patient is able to autonomously move his/her fingers, the control module 54 can be selected to operate under the active assisting mode 545.

The control module 54 controls, when operating under the continuous passive mode 543, the actuator device 32 to drive the transmission module 33 to reciprocally and continuously change between the general state and one of the release state and the grasp state according to the frequency of movement so that the index-middle fingers 902 reciprocally and continuously moves toward and away from the thumb 903 and thus an effect of rehabilitation can be obtained. When the control module 54 operates under the functional mode 544, the transmission module 33 is controlled to operate under the release and grasp states respectively for the first and second time periods so that the muscle tissue and the tendon of the stroke patient are temporally and respectively maintained in the extended and flexed state.

The control module 54 controls, when operating under the active assisting mode 545, the actuator device 32 to deactivate the transmission module 33 and controls the angle detecting device 4 to continuously detect the pivot angle of the transmission module 33. At this time, the stroke patient can move the wrist and move the index-middle fingers 902 and the thumb 903 on his/her own to drive the transmission module 33 to change from the general state to one of the grasp state and the release state. The control device 5 determines whether the pivot angle is smaller than the rehabilitation angle within a predetermined reaction time period. When affirmative, the control module 54 controls the actuator device 32 to drive the transmission module 33 to pivot relative to the fixing seat 31 until the pivot angle is equal to the rehabilitation angle, and controls the actuator device 32 to deactivate the transmission module 33 again to allow the stroke patient to perform next fingers training movement on his/own.

Figure 6:
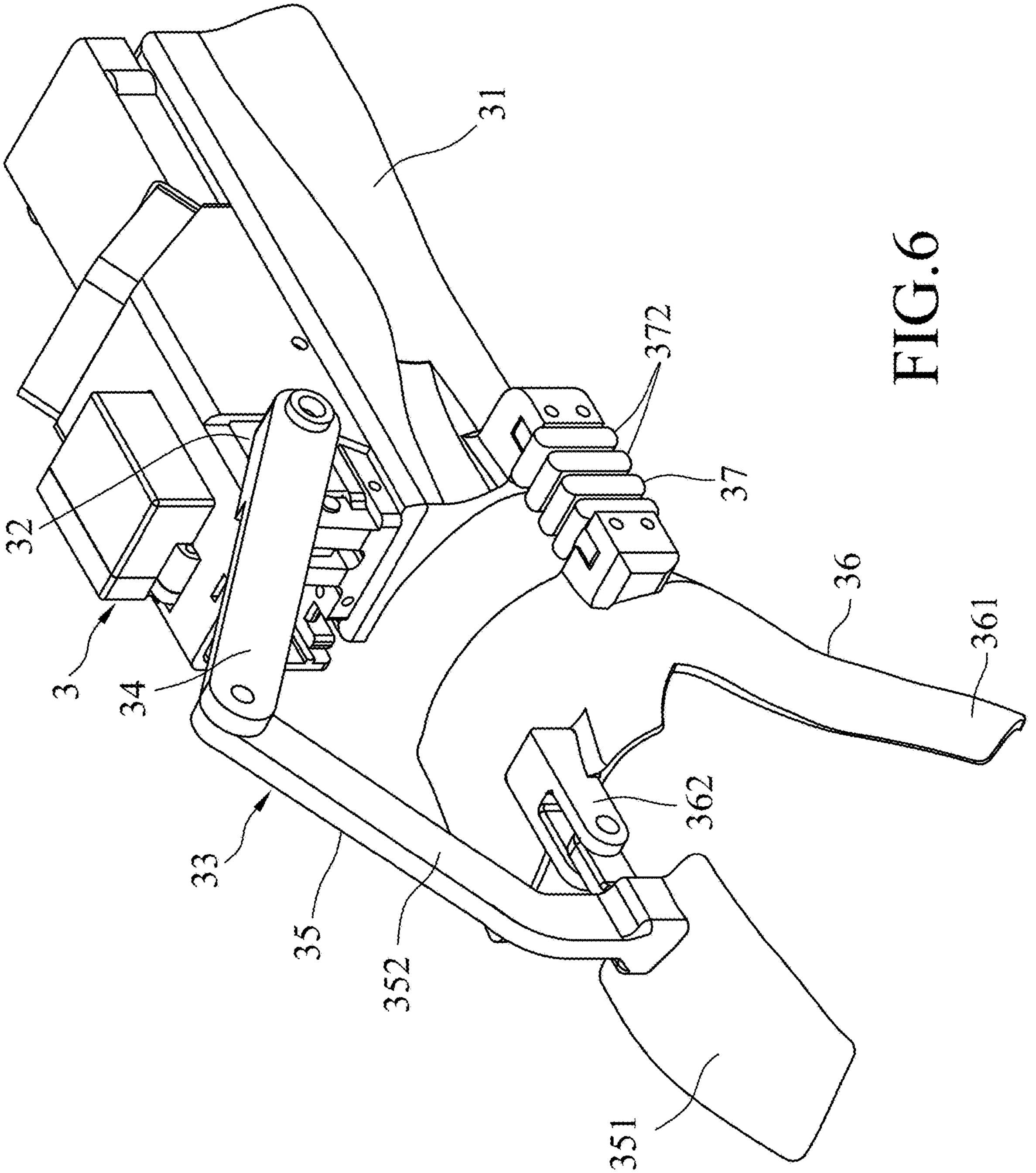
FIG. 6 is a perspective view of an exoskeleton robotic mechanism of a second embodiment of the exoskeleton robotic equipment for tenodesis grasp and release training of the present disclosure.
Figure 7:
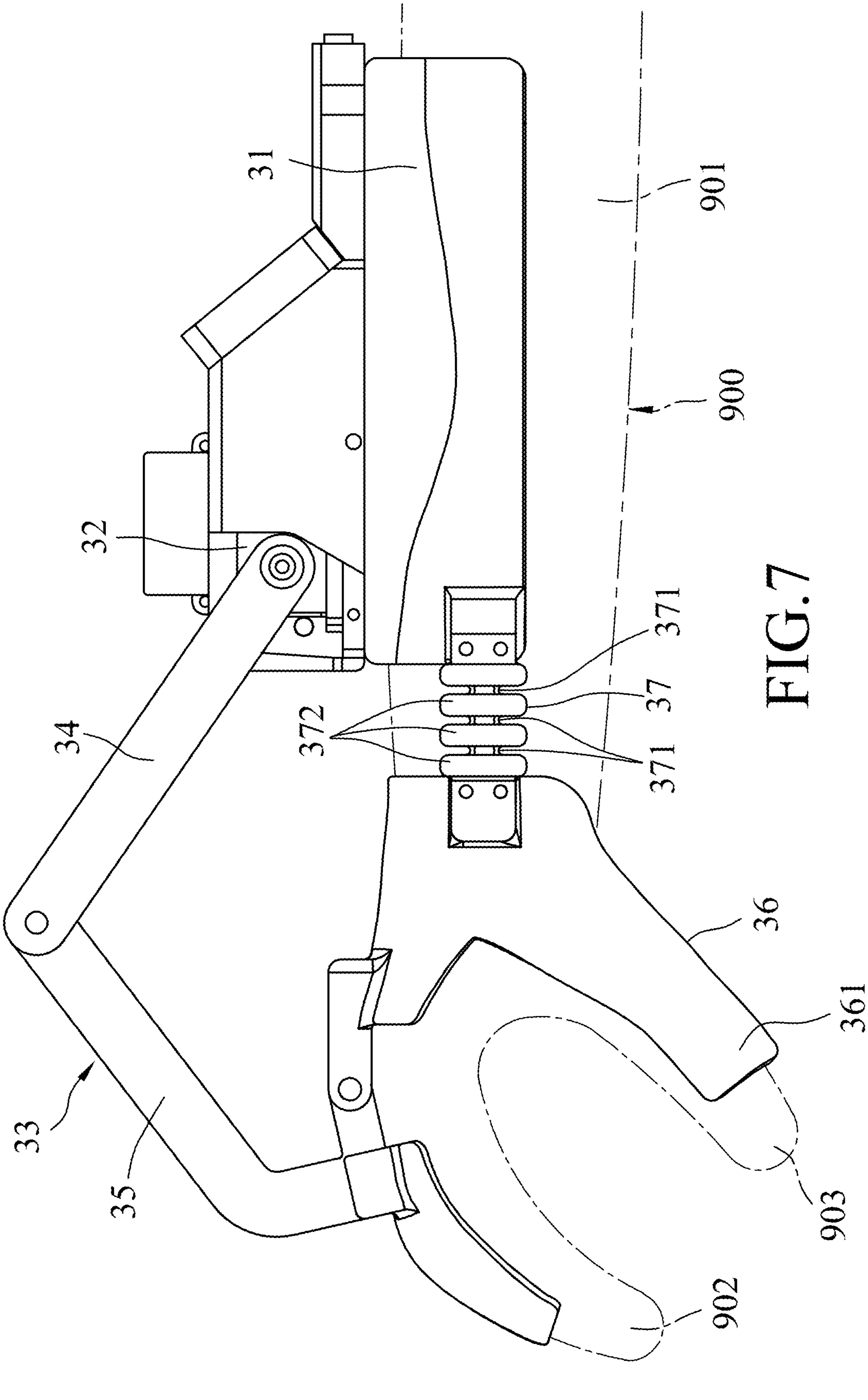
FIG. 7 is a schematic side view illustrating the second embodiment of the exoskeleton robotic equipment worn on a forearm and a hand extending from the forearm.

Referring to FIGS. 6 and 7, a second embodiment of the exoskeleton robotic equipment for tenodesis grasp and release training of the present disclosure is similar to the first embodiment, and the difference therebetween resides in the structure of the transmission module 33. Only the difference between the first and second embodiments will be described in the following for convenience.

In the second embodiment, the second grasp rod 36 of the transmission module 33 is not pivotally connected to the fixing seat 31, and the transmission module 33 further includes a resilient lever 37 connected between the second mount segment 361 of the second grasp rod 36 and the fixing seat 31, and resiliently deformable along an up-down direction and a left-right direction transverse to the up-down direction.

The resilient lever 37 includes a plurality of block portions 372 spaced apart from one another along the left-right direction and a plurality of connecting portions 371 each interconnecting adjacent two of the block portions 372. An outer diameter of each of the connecting portions 371 is smaller than that of each of the block portions 372. The resilient lever 37 is driven to deform by the second grasp rod 36 and the fixing seat 31 along the up-down direction and the left-right direction. Any adjacent two of the block portions 372 are movable relative to each other to abut against each other to limit range of the deformation of the resilient lever 37 along the up-down direction and the left-right direction. In this embodiment, the resilient lever 37 cooperates with the second grasp rod 36, the first grasp rod 35, the transmission member 34 and the fixing seat 31 to constitute the four-bar linkage mechanism.

By virtue of the resilient lever 7, the second grasp rod 36 is able to deform in two dimensions and has two degrees of freedom (DOF) to move. When the wrist joint of the stroke patient is bent, the second grasp rod 36 is able to bring the thumb 903 to move slightly toward flexor carpi radialis and ulnaris side muscles, such movement complies with actual movement of the wrist joint and the specifically designed structures of the resilient lever 7 provide a relatively good lateral support to thereby prevent sprain of the wrist joint.

Figure 8:
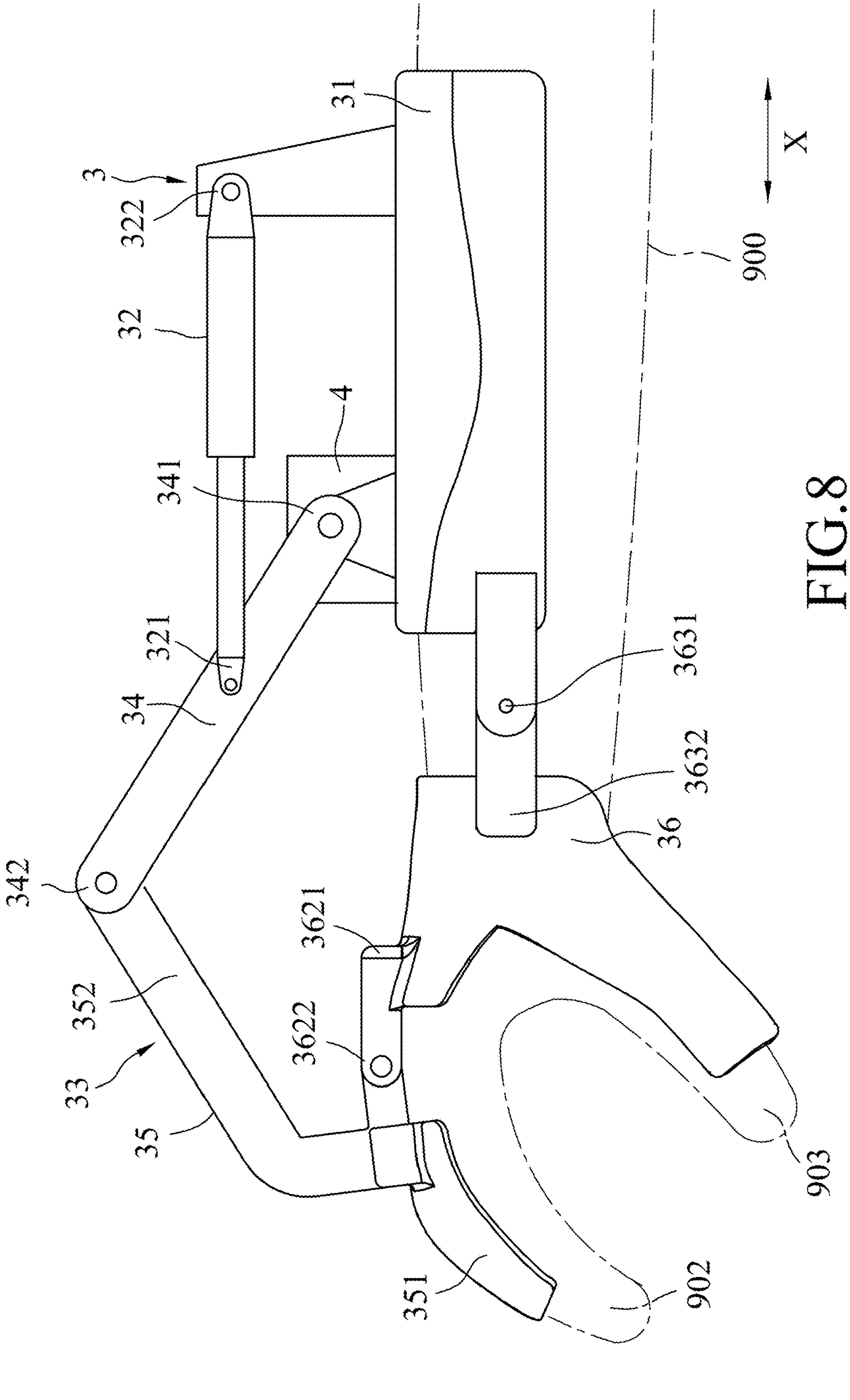
FIG. 8 is a schematic side view illustrating a third embodiment of the exoskeleton robotic equipment for tenodesis grasp and release training of the present disclosure worn on a forearm and a hand extending from the forearm.

Referring to FIG. 8, a third embodiment of the exoskeleton robotic equipment for tenodesis grasp and release training of the present disclosure is similar to the first embodiment, and the difference therebetween reside in the structure of the actuator device 32 and the design of connecting transmission between the actuator device 32 and the transmission module 33.

In the third embodiment, the actuator device 32 is a linear actuator movable along the front-rear direction (X) and has a rear end 322 connected fixedly to the fixing seat 31, and a front end 321 pivotally connected to an intermediate portion of the transmission member 34. The actuator device 32 is, for example but not limited to, a pneumatic cylinder driven by a pneumatic pump, a hydraulic cylinder driven by a hydraulic pump, or an electrically controlled telescopic linear actuator.

The rear end 341 of the transmission member 34 is pivotally connected to the fixing seat 31. The intermediate portion of the transmission member 34 is pivotally connected to the front end 321 of the actuator device 32. The front end 342 of the transmission member 34 is pivotally connected to the first grasp rod 35.

The angle detecting device 4 is configured to detect a pivot angle of the rear end 341 of the transmission member 34 relative to the fixing seat when the transmission module 33 is changed from the general state to one of the grasp state and the release state.

When the exoskeleton mechanism 3 is worn on the hand portion 900, the actuator device 32 is controlled to perform linear movement to drive the transmission member 34 to pivot so as to drive the first grasp rod 35 and the second grasp rod 36 to pivot toward and away from each other such that the index-middle fingers 902 move toward and away from the thumb 903.

It should be stated that the structure of the actuator device 32 and the configuration of transmission between the actuator device 32 and the transmission module 33 of the third embodiment of the present disclosure can be utilized in the second embodiment.

To sum up, by virtue of the structural design of the exoskeleton mechanism 3, the four-bar linkage mechanism constituted by the fixing seat 31, the actuator device 32, the transmission member 34, and the first and second grasp rods 35, 36 is provided to drive the index-middle fingers 902 to move toward and away from the thumb 903 through the tenodesis effect when the wrist is extended and flexed. Further, the exoskeleton mechanism 3 can be controlled to automatically operated under a selected operation mode by the angle detecting device 4 and the control device 5. In this way, it is not necessary for a stroke patient to go to medical institutes for seeking for assistance of a clinical therapist to perform a relative high dose of hand rehabilitation training. Thus, the shortage of human resource in clinical institutes can be alleviated and the exoskeleton mechanism 3 of the present disclosure can be utilized as an assistive device in daily life.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An exoskeleton robotic equipment for tenodesis grasp and release training, comprising an exoskeleton mechanism adapted to be worn on a forearm and a hand extending from the forearm of a stroke patient, and a control device, wherein said exoskeleton mechanism includes a fixing seat adapted to be worn on the forearm, an actuator device mounted to said fixing seat, and a transmission module connected to said fixing seat and pivotally connected to said actuator device, said transmission module including a first grasp rod that is adapted to be mounted fixedly to an index finger and a middle finger of the hand, and a second grasp rod that is pivotally connected to said first grasp rod, and that is adapted to be mounted fixedly to a thumb of the hand, said transmission module cooperating with said fixing seat and said actuator device to form a four-bar linkage mechanism, said actuator device being controlled by said control device to drive said transmission module to move relative to said fixing seat to change said transmission module into a release state such that said first grasp rod and said second grasp rod pivot away from each other so as to move the index finger and the middle finger away from the thumb, and into a grasp state such that said first grasp rod and said second grasp rod pivot toward each other so as to move the index finger and the middle finger toward the thumb;

wherein said transmission module further includes a transmission member having opposite ends connected pivotally and respectively to said actuator device and said first grasp rod, said second grasp rod being pivotally connected between said first grasp rod and said fixing seat, said transmission member cooperating with said first grasp rod, said second grasp rod, said fixing seat and said actuator device to constitute the four-bar linkage mechanism, said four-bar linkage mechanism being a closed-chain movable linkage.

2. The exoskeleton robotic equipment as claimed in claim 1, wherein said actuator device is a motor and includes a rotating shaft, said opposite ends of said transmission member being connected pivotally and respectively to said rotating shaft of said actuator device and said first grasp rod, said first grasp rod including a first mounting segment that is adapted to be mounted fixedly to the index and middle fingers, and a first driven link that extends upwardly and rearwardly from said first mount segment and that is pivotally connected to one of said opposite ends of said transmission member, said second grasp rod including a second mount segment that is adapted to be mounted fixedly to the thumb, a second driven link that has opposite first and second ends, said first end being connected fixedly to a top end of said second mount segment, said second end being pivotally connected to a lower end of said first driven link, and a third driven link that extends from said second mount segment toward said fixing seat and that has opposite ends pivotally and respectively mounted to said fixing seat and said second mount segment.

* * * * *